Dec. 5, 1944.　　W. G. PRENTICE　　2,364,242
TIRE SPREADER
Filed Feb. 11, 1942　　2 Sheets-Sheet 1
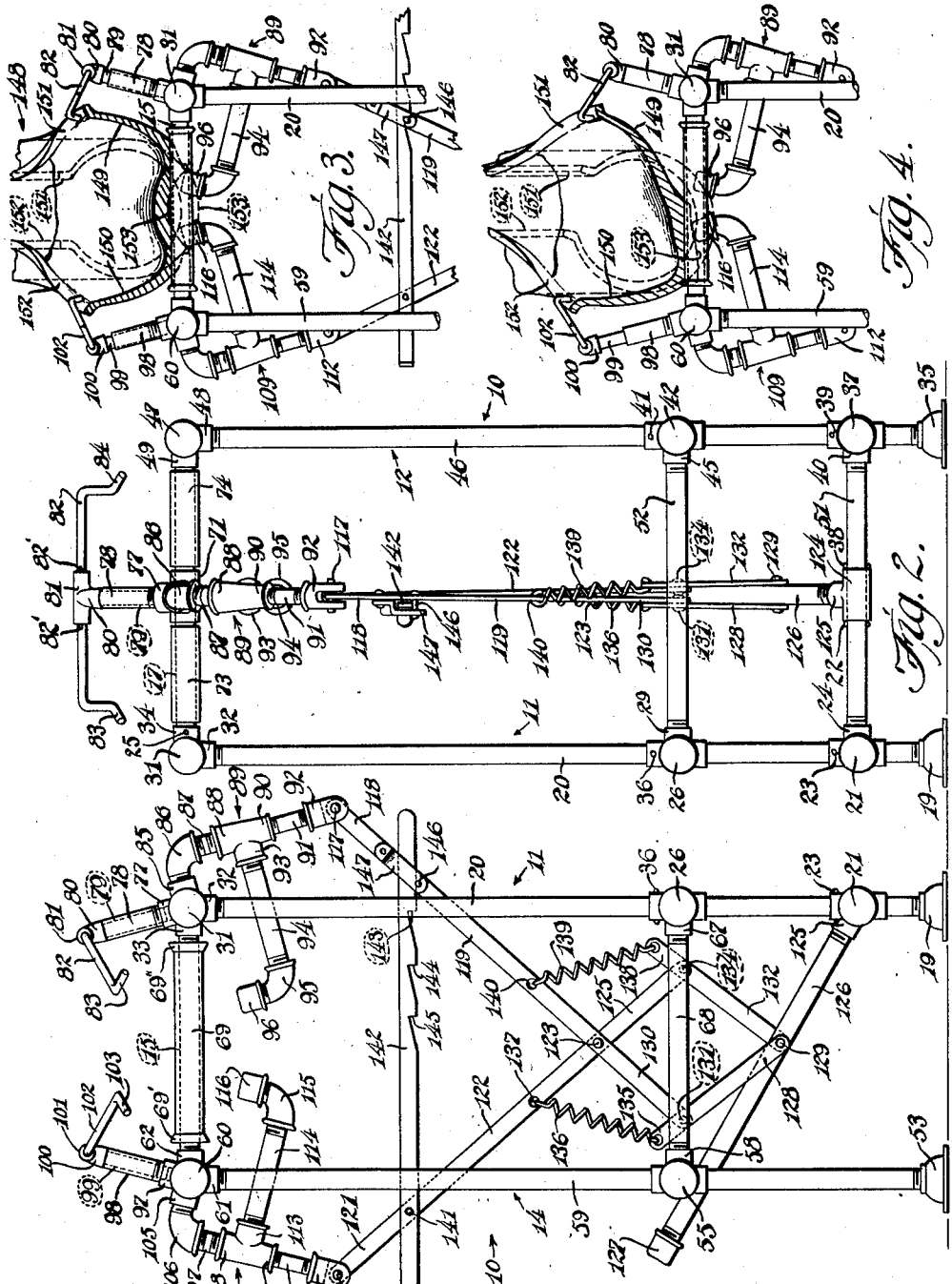
INVENTOR.
WILLIAM G. PRENTICE,
BY:
ATTORNEYS.

Dec. 5, 1944.   W. G. PRENTICE   2,364,242
TIRE SPREADER
Filed Feb. 11, 1942   2 Sheets-Sheet 2
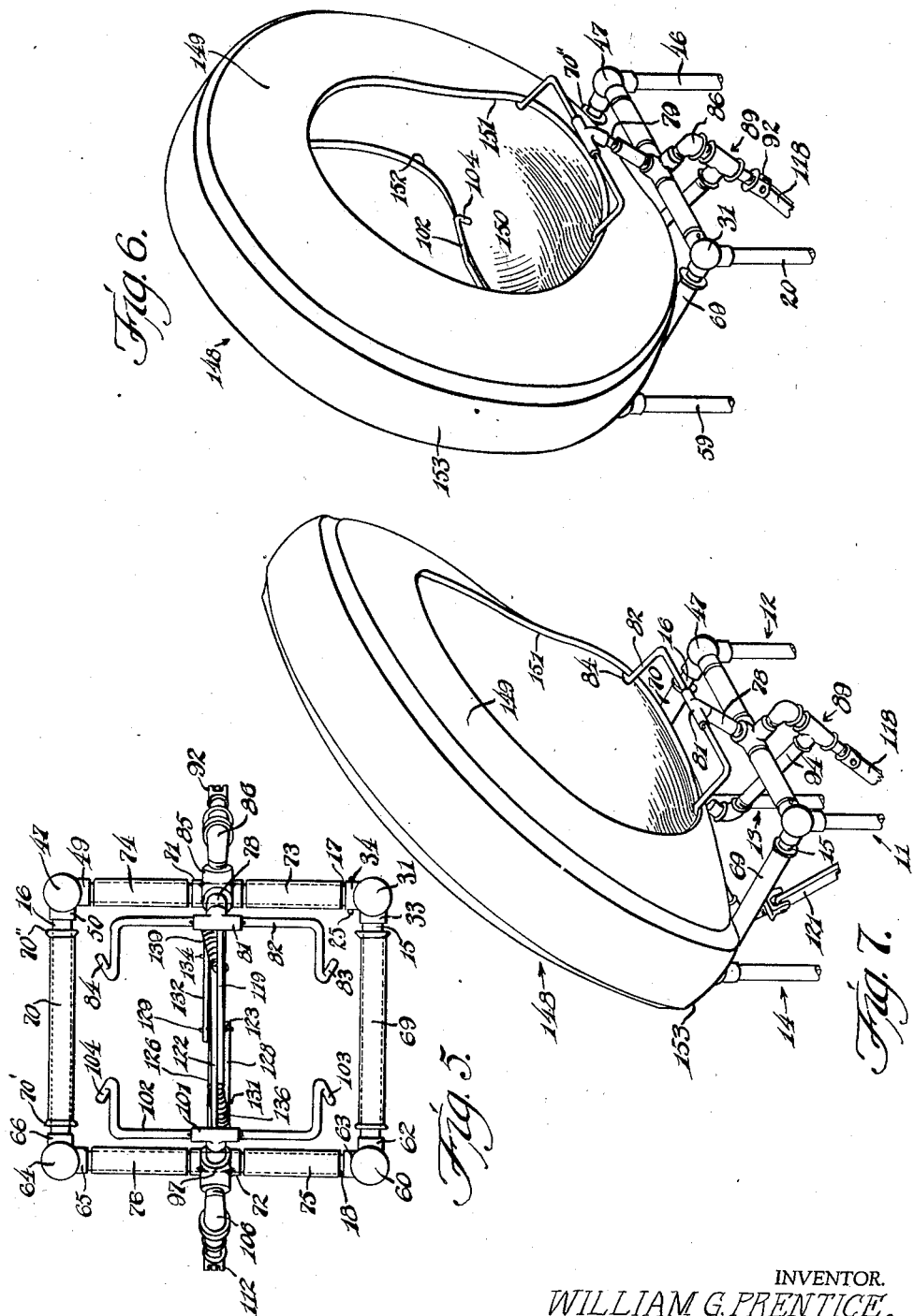
INVENTOR.
WILLIAM G. PRENTICE,
BY Hood & Hahn.
ATTORNEYS.

Patented Dec. 5, 1944

2,364,242

UNITED STATES PATENT OFFICE 2,364,242

TIRE SPREADER

William G. Prentice, Indianapolis, Ind.

Application February 11, 1942, Serial No. 430,427

10 Claims. (Cl. 154—9)

The present invention relates to a tire spreader or inspection machine, and the primary object of the invention is to provide a machine of the character indicated which shall be extremely inexpensive to manufacture, and which shall yet be highly efficient for the purpose of spreading the beads of a tire casing (herein referred to as a tire) to facilitate inspection of the inner surface of the tire, and, when desired, bulging the side wall or tread portion of the tire inwardly, further to facilitate inspection and, in some instances, working upon the inner surface of the tire. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an end elevation of a machine constructed in accordance with the present invention;

Fig. 2 is a side elevation thereof;

Fig. 3 is a fragmentary end elevation of the upper portion of the machine with a tire engaged therein;

Fig. 4 is a similar view, showing the tire canted to one side;

Fig. 5 is a plan view of the machine;

Fig. 6 is an isometric view of the upper portion of the machine with a tire engaged therein; and Fig. 7 is a similar view, showing the tire canted.

Many tire inspection machines of many kinds have been conceived, and a goodly number of them have actually gone into commercial use. To my knowledge, however, all of such machines have been relatively complicated and quite expensive. It is a major intent of my invention to provide an extremely inexpensive, but very efficient, machine to accomplish the functions of the expensive machines heretofore commercially known. One factor which contributes heavily to the low cost of my machine is the fact that it is built almost entirely of standard pipe sections and pipe fittings. Thus, the machine comprises a frame, indicated generally by the reference numeral 10, made up of four uprights, respectively indicated by the reference numerals 11, 12, 13, and 14, connected at their upper ends by end bars 15 and 16 and side bars 17 and 18.

The machine is assembled as follows: One end of the end bar 15 is threaded into a branch 33 of standard side outlet L-fitting 31. A standard pipe section 69, having an inside diameter slightly greater than the outside diameter of the bar 15, and preferably provided with conical end flanges 69' and 69", is then sleeved on the bar 15; whereafter the branch 62 of a standard side outlet L-fitting 60 is threadedly engaged with the opposite end of the bar 15. Now, an end bar 18 is threadedly engaged with the branch 63 of the fitting 60. A spacer 75, comprising a short standard pipe section having an inside diameter slightly greater than the outside diameter of the bar 18, is sleeved on the bar 18, as is a standard four-way fitting 72, which is followed by a second short pipe section 76. The sections 75 and 76 obviously act as spacers to hold fitting 72 substantially at the mid-point of the bar 18.

Now, the branch 65 of a standard side outlet L-fitting 64 is threaded on the opposite end of the bar 18. A second end bar 16 has one end now threaded into the branch 66 of the fitting 64, a pipe section 70, preferably provided with conical end flanges 70' and 70", is sleeved on the bar 16, and one branch 50 of a standard side outlet L-fitting 47 is threaded onto the opposite end of the bar 16. One end of a side bar 17 is threadedly engaged with the branch 49 of the fitting 47, and a fitting 71, similar to fitting 72, spaced from the ends of the bar 17 by spacer sections 73 and 74, is mounted upon the bar 17. The branch 34 of the fitting 31 is reamed out, and the opposite end of the side bar 17 is slidably received in said branch 34, being secured in place by a cotter pin 25.

This assembly obviously produces a rigid top frame. Each of the fittings 31, 47, 60, and 64 is provided with a branch having its axis perpendicular to the plane defined by the branches in which are secured the end bars and side bars 15, 16, 17, and 18; and each of those branches receives an end of one of the uprights 11, 12, 13, and 14. Thus, the upright 11 comprises a standard pipe section 20 the upper end of which is threadedly received in the branch 32 of the fitting 31. Similarly, the upright 12 comprises a similar standard pipe section 46, the upper end of which is threadedly received in the branch 48 of the fitting 47; the upright 13 comprises a similar pipe section having its upper end threadedly received in the corresponding branch of the fitting 64; and the upright 14 comprises a similar pipe section 59 having its upper end threadedly received in the branch 61 of the fitting 60. A foot piece 19 is adjustably threadedly secured to the lower end of the pipe section 20 to compensate for any slight differences between the effective length of the upright 11 and the effective lengths of the other uprights, while the uprights 12 and 14 are similarly provided with foot pieces 35 and 53 respectively, and the upright 13 is provided with a similar foot piece (not shown).

A bracing assembly similar to the top frame above described is associated with the uprights 11, 12, 13, and 14 intermediate their ends. Thus, a standard four-way fitting 26, comprising two aligned branches 27 and 28 and two other branches 29 and 67 perpendicular to each other and to said aligned branches, is sleeved upon the upright 11, and is secured thereto by a cotter pin 36. One end of a cross bar 52 is threadedly secured in the branch 29 of said fitting 26, while the other end of said bar 52 is threadedly received in a corresponding branch 45 of a similar fitting 42 sleeved on the upright 12 and secured thereto by a cotter pin 41. A similar cross bar 68 has one end threadedly received in the branch 67 of the fitting 26, and its other end threadedly received in the corresponding branch 58 of a similar fitting 55, sleeved on the upright 14. A bar (not shown) corresponding to and parallel with the bar 68 extends between the other branch of the fitting 42 and the corresponding branch of a similar fitting (not shown) sleeved on the upright 13; and a bar (not shown) corresponding to and parallel with the bar 52 extends between said last-mentioned fitting and the fitting 55. I have found it unnecessary to pin the fitting 55 and the corresponding fitting (not shown) to the uprights 14 and 13, respectively.

A standard T-fitting 21 is sleeved on the upright 11 below the fitting 26, and is secured thereto by a cotter pin 23. A similar fitting 37 is sleeved on the upright 12 and is secured thereto by a cotter pin 39. A bar 51 is threadedly engaged in, and extends between, the branches 24 and 40 of the fittings 21 and 37, respectively; and a T-fitting 124 is oscillably mounted upon the bar 51, (by which I mean that the T-fitting is capable of oscillation with respect to the bar) being held against axial movement with respect thereto by cotter pins 22 and 38.

It will be seen that a very rigid frame is thus built up of standard plumbing elements; and that the pipe sections 69 and 70 act as rollers to support a tire upon the machine, and to facilitate rotation of the tire about its intended axis of rotation.

The fitting 71 is formed with a branch 77 perpendicular to the axis of the side bar 17, and a pipe section 78 has one end threadedly received in said branch 77. Telescopically received within the pipe section 78 is a smaller pipe section 79 threadedly supporting, at its outer end, the stem 80 of a T-fitting 81. A hook element, comprising a body section 82 and suitably bent arms or hook fingers 83 and 84 at its opposite ends, is received in the arms of the fitting 81, and it will be obvious that said hook means is rotatable about the axis of its body portion 82. Cotter pins 82', 82' are projected through the body section 82 of the hook means to hold the same against axial movement with respect to the fitting 81.

The fitting 71 is formed with a further branch 85, perpendicular to the axis of the side bar 17 and to the branch 77, and one end of a standard reducer elbow fitting 86 is threadedly received in said branch 85. The opposite end of said reducer elbow 86 threadedly receives one end of a short pipe section 87, the opposite end of which is threadedly received in one end 88 of a reducer T-fitting 89, the aligned end 90 of which threadedly receives one end of a standard pipe section 91 which threadedly carries at its opposite end a bifurcated cap fitting 92. The stem 93 of the T 89 threadedly receives one end of a standard pipe section 94 the opposite end of which threadedly carries one end of a reducer elbow 95, the opposite end of which threadedly receives a cap 96. The unit comprising the element 94, 95, 96, may be referred to as a bulger finger, which, in use, will operate to bulge either the side wall or the tread portion of the tire inwardly.

Similarly, the fitting 72 includes a branch 97 perpendicular to the axis of the side bar 18, and threadedly receiving one end of a pipe section 98 in which is telescopically mounted a pipe section 99 threadedly receiving, on its outer end, the stem 100 of a T fitting 101. A hook means, comprising a body section 102 and bent hooked end portions 103 and 104, is oscillably received in the arms of the T fitting 101, and is in all particulars similar to, but allochirally mounted with respect to, the hook means 82, 83, 84.

The fitting 72 is likewise provided with a branch 105 perpendicular to the body portion of the fitting and to the branch 97, and receiving one end of a reducer elbow 106, the opposite end of which threadedly receives one end of a short pipe section 107 which threadedly carries at its opposite end one end 108 of a reducer T fitting 109. The aligned branch 110 of said T fitting threadedly receives one end of a pipe section 111 which threadedly carries at its opposite end a bifurcated cap 112 similar to the element 92. The stem 113 of the fitting 109 threadedly receives one end of a pipe section 114, the opposite end of which threadedly carries one end of a reducer elbow 115 upon the opposite end of which is threadedly mounted a cap 116. The unit 114, 115, 116 is similar to, but allochirally mounted with respect to, the unit 94, 95, 96.

A pin 117 passes between the furcations of the element 92 and forms a pivotal mounting for one end 118 of a long link 119. Similarly, a pin 120 passes between the furcations of the element 112 and forms a pivotal mounting for the corresponding end 121 of a second long link 122. The links 119 and 122 are pivoted together at 123.

The stem 125 of the T-fitting 124 threadedly receives one end of a pipe section 126 which carries at its opposite end a cap 127. This unit comprises an operating lever. A short link 128 has one end pivoted at 129 upon the lever 126 intermediate the ends thereof; and the end 130 of the link 119 is pivoted, at 131, intermediate the ends of the link 128. A short link 132 likewise has one end pivoted at 129 upon the lever 126, and the end 133 of the link 122 is pivoted at 134 intermediate the ends of the link 132. The end 135 of the link 128 is connected, by a spring 136, to a point 137 on the link 122 between the pivot 120 and the pivot 123; while the end 138 of the link 132 is connected by a spring 139 with a point 140 on the link 119 between the pivot 117 and the pivot 123.

At 141, a latch bar 142 is pivotally secured to the link 122; and said bar 142 is formed with a plurality of teeth 143, 144, and 145 selectively engageable with a pin 146 carried by the link 119, the bar 142 being guided for cooperation with said pin 146 between the link 119 and a strap 147 secured thereto.

It will be seen that the springs 136 and 139 normally hold the parts in the positions illustrated in Fig. 1. It will further be seen that the links 119, 122, 128, and 132 comprise a "lazy tongs" unit; and that counterclockwise movement of the lever 126 will produce movement of the ends 118 and 121 of the links 119 and 122 toward each other to swing the fittings 71 and 72 simultaneously and oppositely about the axes of the side bars 17 and 18 to move the hook units 82 and 102 away from each other.

When the machine is to be put into use, the hook units 82 and 102 are swung in a clockwise direction and a counterclockwise direction, respectively, out of the positions of Fig. 1 to clear the space between the fittings 80 and 100. A tire is then set upon the rollers 69 and 70 in a vertical plane, as illustrated in Figs. 3 and 6. The hook units 82 and 102 may now be swung inwardly about the axes of the arms 81 and 101, whereby the hooks 83 and 84 and the hooks 103 and 104 will engage within the bead portions 151 and 152 of the tire wall portions 149 and 150, respectively. It will be seen that the machine is readily adaptable to tires of different dimensions, since the fittings 80 and 101 may be variously positioned with respect to the bars 17 and 18 because of the telescopic association of the pipes 79 and 99 with the pipes 78 and 98.

If the lever 126 is now depressed sufficiently to engage the tooth 143 of the bar 142 with the pin 146, the beads 151 and 152 will be somewhat separated, but the caps 96 and 116 will not be brought quite into contact with the tread 153 of the tire 148. In this position of the machine, the interior of the tire may be seen fairly well, but the engagement of the hooks 83, 84, 103, and 104 with the tire is sufficiently light to permit the tire to be rotated about its axis of intended rotation, without releasing the hooks from the tire beads. Of course, such rotation of the tire is facilitated by the presence of the rollers 69 and 70.

Further depression of the lever 126 will further spread the beads 151 and 152, and will cause the caps 96 and 116 to engage the tread 153 of the tire and to bulge that tread upwardly and inwardly to increase the facility of the operator's view of the interior surface of the tire. Complete depression of the lever 126 will bring the parts into the positions illustrated in Fig. 3, wherein the whole interior surface of the tire is fully exposed to view, and such surface is exposed for work to be done thereon.

A very important feature of the present invention resides in the fact that the illustrated construction permits rocking of the tire about an axis lying within the general plane of the tire; and that rocking may be effected while the tire is engaged by the hook means. Thus, with the parts in the position of Fig. 3, it is possible to rock the tire into the position of Figs. 4 and 7. This operation is made possible by the telescopic association of the hook carriers with the pipes 78 and 98. Thus, as the tire is rocked in a clockwise direction from the position of Fig. 3 to the position of Fig. 4, the pipe section 79 will settle more deeply into the pipe section 78, while the pipe section 99 is drawn farther out of the pipe section 98. Now further depression of the lever 126 will bring one or both of the bulger finger caps 96 and 116 into engagement with the tire in such a fashion as to bulge the tire side wall inwardly in the manner illustrated in Figs. 4 and 7. This capacity of the machine materially aids the operator in working upon a break in the side wall of the tire, and is an extremely important feature of the present construction, which is believed to be entirely novel.

I claim as my invention:

1. A tire inspection machine comprising means for supporting a tire, a fulcrum carried by said supporting means on each side of, and substantially parallel with, the median plane of said tire perpendicular to the axis of intended rotation of said tire, a carrier oscillably mounted on each of said fulcra, and including an element axially perpendicular to the associated fulcrum, a member axially slidably carried by each of said elements, a hook element carried by each of said members for independent oscillation upon an axis substantially parallel with its associated fulcrum and engageable with the bead portion of a wall of such tire, and means for oscillating said carriers to force said hook means away from each other.

2. A tire inspection machine comprising a frame including four uprights joined by end bars and side bars, rollers freely rotatably mounted on said end bars for supporting a tire, a tubular carrier oscillably mounted on each of said side bars and including a perpendicularly projecting element, a member axially slidably mounted on each of said elements, hook means carried by each of said members, said hook means being mounted for oscillation upon an axis substantially parallel with said side bars and being respectively engageable with the bead portions of the adjacent side walls of such tire, and operating means mounted on said frame and operatively connected with said carriers to oscillate said carriers simultaneously in opposite directions.

3. A tire inspection machine comprising a frame including four uprights joined by end bars and side bars, rollers freely rotatably mounted on said end bars for supporting a tire, a tube oscillably mounted on each of said side bars, an arm projecting generally upwardly from each of said tubes, hook means carried by each of said arms and engageable with the bead portion of the adjacent wall of such tire, a second arm projecting from each of said tubes and angularly related to the first arm of its associated tube, a lever pivotally mounted on said frame, means operatively connecting said lever with the second arm of each tube to shift said tubes in opposite directions in response to swinging movement of said lever, and means operatively associated with said lever and shiftable, in response to hook-separating movement of said lever, to engage and bulge inwardly a portion of the tread of such tire.

4. A tire inspection machine comprising a frame including four uprights joined by end bars and side bars, rollers freely rotatably mounted on said end bars for supporting a tire, a tube oscillably mounted on each of said side bars, an arm projecting generally upwardly from each of said tubes, hook means carried by each of said arms and engageable with the bead portion of the adjacent wall of such tire, a second arm projecting from each of said tubes and angularly related to the first arm of its associated tube, a lever pivotally mounted on said frame, means operatively connecting said lever with the second arm of each tube to shift said tubes in opposite directions in response to swinging movement of said lever, and a finger operatively associated with each of said tubes and engageable, at times, with the tread of such tire to bulge the same inwardly.

5. A tire inspection machine comprising a frame including four uprights joined by end bars and side bars, rollers freely rotatably mounted on said end bars for supporting a tire, a tube oscillably mounted on each of said side bars, an arm projecting generally upwardly from each of said tubes, hook means carried by each of said arms and engageable with the bead portion of the adjacent wall of such tire, a second arm projecting from each of said tubes and angularly related to the first arm of its associated tube, a lever pivotally mounted on said frame, means operatively connecting said lever with the second arm of each tube whereby movement of said lever in one direction shifts both tubes to move said hook means apart, thereby spreading the engaged walls of said tire, and a finger operatively associated with each of said tubes and moved, by such movement of said lever, to engage the tread of such tire between the wall portions engaged by such hooks, to bulge such tread portion inwardly.

6. A tire inspection machine comprising a plurality of uprights, a pair of end members joining certain of said uprights, a pair of side members joining certain of said uprights, at least the midportions of said side members being cylindrical, a pipe fitting having two angularly related lateral branches oscillably sleeved on the cylindrical portion of each of said side members, a cylindrical element secured to one of said branches of each of said fittings, a member telescopically associated with each of said elements and carrying hook means engageable with the bead portion of the adjacent wall of a tire supported on said end members, lever means connected to the other branch of each of said fittings, a finger projecting laterally inwardly from each of said lever means at a level below said end members and terminating in an upturned end disposed adjacent the tread of such tire, a link pivotally connected to each of such lever means, said two links being crossed and pivoted together, a lever pivoted on said frame, a pair of links pivoted on said lever and pivoted respectively to said first-mentioned links, and spring means connecting said last-mentioned links with said first-mentioned links.

7. A tire inspection machine comprising a plurality of uprights, a pair of end members joining certain of said uprights, a pair of side members joining certain of said uprights, at least the midportions of said side members being cylindrical, a pipe fitting having two angularly related lateral branches oscillably sleeved on the cylindrical portion of each of said side members, a cylindrical element secured to one of said branches of each of said fittings, a member telescopically associated with each of said elements and carrying hook means engageable with the bead portion of the adjacent wall of a tire supported on said end members, lever means connected to the other branch of each of said fittings, a finger projecting laterally inwardly from each of said lever means at a level below said end members and terminating in an upturned end disposed adjacent the tread of such tire, a first link pivoted to one of said lever means, a second link pivoted to the other of said lever means, means pivotally connecting said first and second links together intermediate their ends, a lever pivoted on said frame, a third link pivoted at one end on said lever and pivotally connected intermediate its ends to said first link, a fourth link pivoted at one end on said lever at the point of pivotal connection of said third link thereto and pivotally connected intermediate its ends to said second link, spring means connecting the other end of said third link with said second link, and spring means connecting the other end of said fourth link with said first link.

8. A tire inspection machine comprising a plurality of uprights, a pair of end members joining certain of said uprights, a pair of side members joining certain of said uprights, at least the midportions of said side members being cylindrical, a pipe fitting having two angularly related lateral branches oscillably sleeved on the cylindrical portion of each of said side members, a cylindrical element secured to one of said branches of each of said fittings, a member telescopically associated with each of said elements and carrying hook means engageable with the bead portion of the adjacent wall of a tire supported on said end members, lever means connected to the other branch of each of said fittings, a finger projecting laterally inwardly from each of said lever means at a level below said end members and terminating in an upturned end disposed adjacent the tread of such tire, a first link pivoted to one of said lever means, a second link pivoted to the other of said lever means, means pivotally connecting said first and second links together intermediate their ends, a lever pivoted on said frame, a third link pivoted at one end on said lever and pivotally connected intermediate its ends to said first link, a fourth link pivoted at one end on said lever at the point of pivotal connection of said third link thereto and pivotally connected intermediate its ends to said second link, spring means connecting the other end of said third link with said second link at a point between the pivotal connection of said second link with said lever means and the point of pivotal connection of said second link with said first link, and spring means connecting the other end of said fourth link with said first link at a point between the pivotal connection of said first link with said lever means and the point of pivotal connection of said first link with said second link.

9. A tire inspection machine comprising a plurality of uprights, a pair of end members joining certain of said uprights, a pair of side members joining certain of said uprights, at least the midportions of said side members being cylindrical, a pipe fitting having two angularly related lateral branches oscillably sleeved on the cylindrical portion of each of said side members, a cylindrical element secured to one of said branches of each of said fittings, a member telescopically associated with each of said elements and carrying hook means engageable with the bead portion of the adjacent wall of a tire supported on said end members, lever means connected to the other branch of each of said fittings, a finger projecting laterally inwardly from each of said lever means at a level below said end members and terminating in an upturned end disposed adjacent the tread of such tire, a link pivotally connected to each of such lever means, said two links being crossed and pivoted together, a lever pivoted on said frame, a pair of links pivoted on said lever and pivoted respectively to said first-mentioned links, spring means connecting said last-mentioned links with said first-mentioned links, and a latch bar pivotally mounted on one of said links and cooperable with means on another of said links to hold said pipe fittings in any one of a plurality of positions of adjustment.

10. A tire inspection machine comprising means for supporting a tire, a fulcrum carried by said supporting means on each side of, and substantially parallel with, the median plane of said tire perpendicular to the axis of intended rotation of said tire, a carrier oscillably mounted on each of said fulcra, and including an element axially perpendicular to the associated fulcrum, a member axially slidably carried by each of said elements, a hook element carried by each of said members for independent oscillation upon an axis substantially parallel with its associated fulcrum and engageable with the bead portion of a wall of such tire, means for oscillating said carriers to force said hook means away from each other, and means operated by said last-named means, upon separating said hook means, to engage the tread of said tire and bulge the same inwardly.

WILLIAM G. PRENTICE.